United States Patent [19]

Jenski

[11] Patent Number: 5,482,083
[45] Date of Patent: Jan. 9, 1996

[54] QUICK CONNECT COUPLING

[75] Inventor: Gary M. Jenski, Jackson, Mich.

[73] Assignee: Aeroquip Corporation, Maumee, Ohio

[21] Appl. No.: 327,982

[22] Filed: Oct. 24, 1994

[51] Int. Cl.⁶ .................................................. F16L 37/28
[52] U.S. Cl. ...................... 137/614.03; 285/307
[58] Field of Search .......................... 137/614.03, 614.04;
285/307, 376, 396, 361

[56] References Cited

U.S. PATENT DOCUMENTS

| | | |
|---|---|---|
| 2,538,683 | 1/1951 | Guiler et al. . |
| 3,826,523 | 7/1974 | Eschbaugh . |
| 3,847,421 | 11/1974 | Eschbaugh et al. . |
| 4,198,078 | 4/1980 | Herbert . |
| 4,240,651 | 12/1980 | Mariaulle . |
| 4,519,449 | 5/1985 | Hoskins et al. . |
| 4,538,679 | 9/1985 | Hoskins et al. . |
| 4,541,658 | 9/1985 | Bartholomew . |
| 4,637,640 | 1/1987 | Fournier et al. . |
| 4,647,082 | 3/1987 | Fournier et al. . |
| 4,749,214 | 6/1988 | Hoskins et al. . |
| 4,786,085 | 11/1988 | Sauer et al. ........................ 285/307 X |
| 4,793,637 | 12/1988 | Laipply et al. . |
| 4,902,043 | 2/1990 | Zillig et al. . |
| 4,991,627 | 2/1991 | Nix ..................................... 137/614.03 |
| 5,104,157 | 4/1992 | Bahner .................................... 285/307 |

FOREIGN PATENT DOCUMENTS 327440  8/1989  France ..................................... 285/307

Primary Examiner—Martin P. Schwadron
Assistant Examiner—Kevin L. Lee
Attorney, Agent, or Firm—Emch, Schaffer, Schaub & Porcello Co.

[57] ABSTRACT

A quick connect coupling for joining opposing ends of a fluid flow line includes a sleeve member and a body member sized to be received in the open engagement end of the sleeve member. The sleeve member has resilient, laterally displaceable fingers joined at one end and tapering inwardly toward the axis in cantilever fashion to free ends. Upon insertion of the body member in the sleeve member, the body member contacts the fingers and urges the cantilevered portions including the free ends outwardly. Upon complete insertion, the free ends snap inwardly to engage shoulders of the body member. The body member has a series of camming faces adjacent each shoulder. The sleeve is rotatable about the body member to displace the free ends of the fingers outwardly and to align such fingers with portions of the body member away from such shoulders to thereby release the body member from the sleeve member.

21 Claims, 4 Drawing Sheets

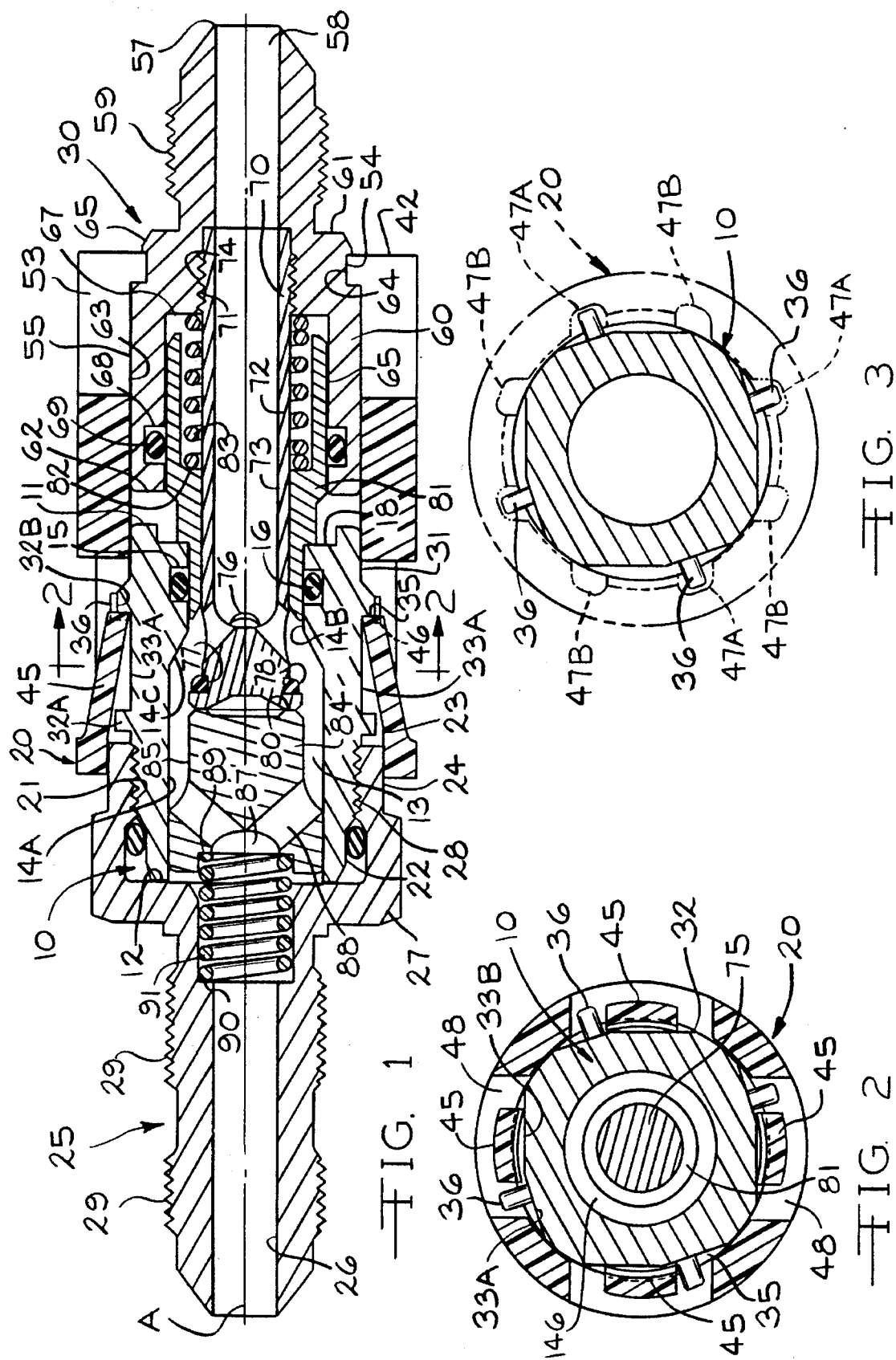

5,482,083

QUICK CONNECT COUPLING

BACKGROUND ART

The present invention relates to a coupling which may be characterized as a quick connect coupling in the sense that the parts to be joined together may be secured to one another by a simple axial movement in which a male member is inserted in a female member having associated therewith a plurality of fingers which become resiliently displaced outwardly from the axis as the male member is inserted and which snap in place to engage a shoulder of the male member upon its complete insertion. One such coupling is disclosed in U.S. Pat. No. 4,637,640 which is assigned to the assignee of the present invention. In order to disengage the male member from the female member of the above-identified prior art coupling, it is necessary to provide some type of tool which will bias the fingers outwardly of the axis in order to release them from the shoulder. Other prior art couplings of this general type include a sleeve or unlocking ring as a part of the coupling itself. See, for example, U.S. Pat. No. 4,647,082 (assigned to the assignee of the present invention) which utilizes a release sleeve 62 slideably moveable to engage and release the fingers 74. Both of the above-identified patents are incorporated herein by reference.

DISCLOSURE OF THE INVENTION

Under the present invention, a coupling is provided having a sleeve member and a body member sized to be received in the open engagement end of the sleeve member. The sleeve member has resilient, laterally displaceable fingers joined at one end and tapering inwardly toward the axis in cantilever fashion to free ends. The ends of the fingers lie within a circle having a diameter which is smaller than the open engagement end and smaller than the body member. Upon insertion of the body member in the sleeve, the body member contacts the fingers and urges the cantilevered portions including the free ends outwardly. Upon complete insertion the free ends snap inwardly to engage shoulders of such body member. The body member has a series of camming faces adjacent each shoulder. Upon rotation of the sleeve relative to the body member, the camming faces of the body member displace the free ends of the fingers of the sleeve outwardly and align such fingers with portions of the body member away from such shoulders to thereby release such body from the sleeve.

The prior art couplings which utilize a tool or release sleeve to disengage the fingers require substantial clearance between the joined parts with the result that such couplings do not have good side-load support. The coupling of the present invention may be designed to provide for contact between specific portions of the joined members in addition to the engaged fingers and shoulders thereby providing good side-load support.

Accordingly, it is an object of the present invention to provide a coupling in which the male member may be readily and easily engaged to the female member by a simple axial movement of the properly aligned parts and which may be disengaged by a slight axial movement followed by simple rotational movement of one part relative to the other without the necessity of a separate sleeve or tool to release the fingers.

BRIEF DESCRIPTION OF THE DRAWINGS

FIG. 1 is a sectional view showing the coupling of the present invention with the parts joined together with fingers of the sleeve engaging aligned shoulders of the body member.

FIG. 2 is a sectional view taken through line 2—2 of FIG. 1.

FIG. 3 is a view, partly in section, of the body member with the sleeve in phantom lines showing the relative rotational positioning of the body member and sleeve when the parts are assembled in the locked position.

BEST MODE FOR CARRYING OUT THE INVENTION

Figure 4:
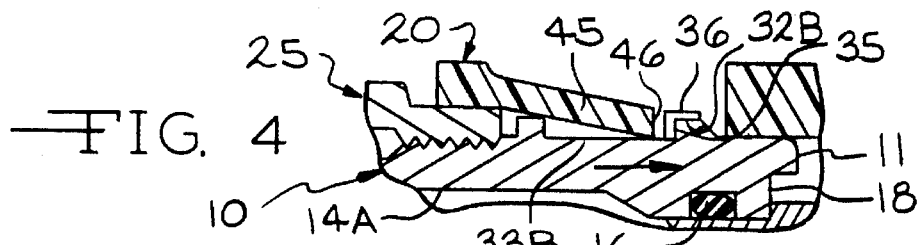
FIG. 4 is an enlarged fragmentary sectional view showing the relative positioning of the parts following axial movement of the body further into the sleeve preparatory to rotational disengagement of the body from the sleeve and showing one of the fingers disengaged from one of the shoulders and one of the posts.
Figure 5:
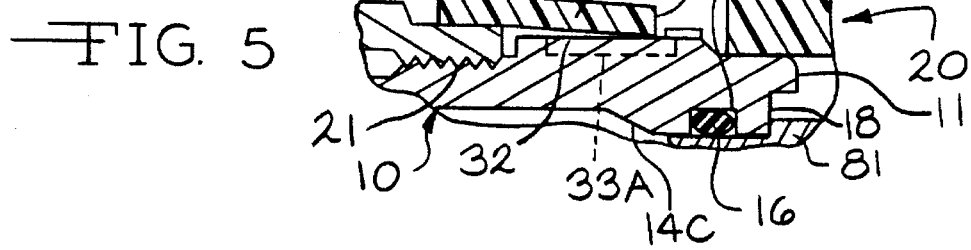
FIG. 5 is a view showing the relative positioning of the same parts shown in FIG. 4 following relative rotation of the parts to align the fingers with radially enlarged release areas between the shoulders.
Figure 6:
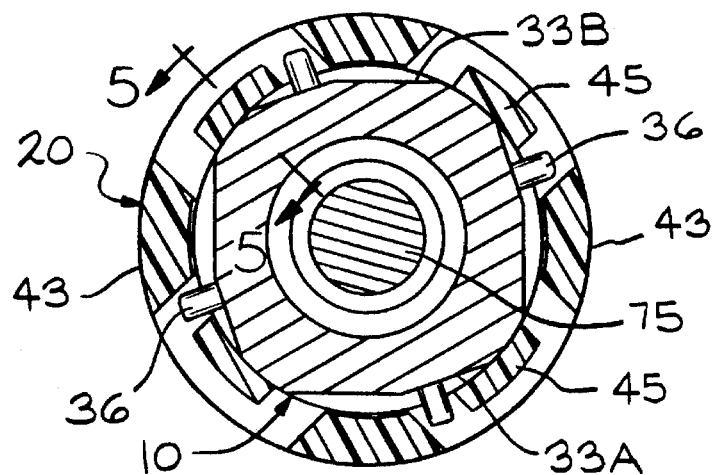
FIG. 6 is a sectional view similar to FIG. 2 but showing the parts following relative rotation to the unlocked position.
Figure 7:
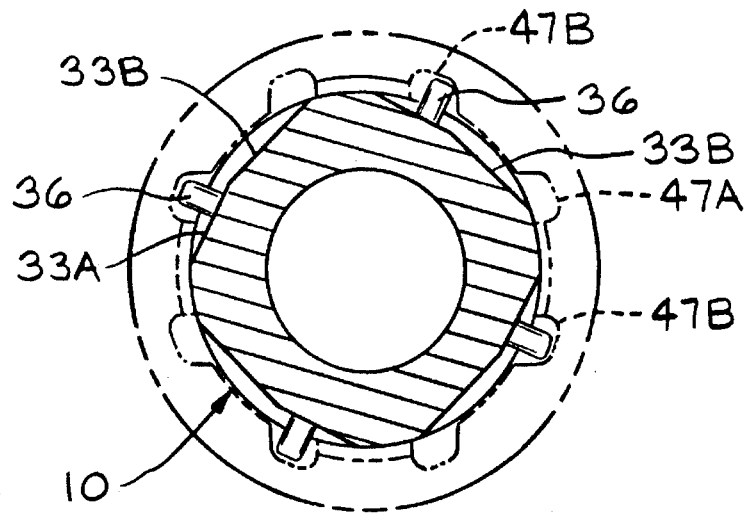
FIG. 7 is a view similar to FIG. 3 but showing the parts in the unlocked position.

Referring now to the drawings, there is provided a body member 10 defining a major component of the male half of the coupling and a sleeve 20 mounted on an adapter 30 defining the female half of the coupling. The sleeve 20 should be manufactured from a suitable injection moldable plastic material such as, for example, Delrin® acetal resin. The body member 10 and the adapter 30 could be manufactured from a suitable plastic material or metal.

The body 10 extends along an axis A from a mating end 11 intended to be positioned in the sleeve 20 upon joining of the coupling halves together to an opposing end 12. The body 10 has a passageway 13 extending therethrough. The passageway 13 is defined by an interior wall which includes an enlarged cylindrical wall portion 14A extending inwardly from said opposing end 12, a reduced cylindrical wall portion 14B adjacent said mating end 11 and a tapered wall portion 14C joining said enlarged cylindrical wall portion 14A and said reduced cylindrical wall portion 14B. The reduced cylindrical wall portion 14B is provided with an inwardly facing annular groove 15 in which is positioned an O-ring type seal 16. The mating end 11 is recessed adjacent the reduced cylindrical wall portion 14B to form a shoulder 18.

The body member 10 is provided with outwardly facing threaded portion 21 in the vicinity of the opposing end 12. An outwardly facing cylindrical wall portion 22 having a diameter smaller than the root diameter of the threaded portion 21 is positioned between the threaded portion 21 and the opposing end 12.

The body 10 is mounted on a connector 25 having a passageway 26 extending along the axis A and having outwardly facing threaded portions 29 intended to engage the threaded coupling of a fluid flow line (not shown). The connector 25 includes an enlarged bell housing 27 having an inwardly facing threaded portion 28 to which is engaged the threaded portion 21 of the body 10. The threaded portion 28 of the connector 25 extends to an engagement end 23. Opposing the threaded portion 28 between the bell housing 27 and the end 23 is an exterior cylindrical wall portion 24 of predetermined diameter.

Exteriorly the portion of the body member 10 between the mating end 11 and the threaded portion 21 includes a lead-in portion 31 having a cylindrical exterior surface of predetermined diameter and an intermediate portion 32. The intermediate portion 32 has a generally cylindrical configuration with a diameter larger than that of the lead-in portion 31. Four recessed camming sections are positioned in the intermediate section 32. Each of the camming sections is generally parallel to the axis A and includes a first camming face 33A and a second camming face 33B. The camming faces 33A and 33B extend only a portion of the axial length of the intermediate portion 32 such that there is a first cylindrical wall segment 32A adjacent the threaded portion 21 and a second cylindrical wall segment 32B adjacent the lead-in portion 31. The first cylindrical wall segment 32A cooperates with the respective recessed camming faces 33A and 33B to form a series of first shoulders 34 facing toward the mating end 11. The second cylindrical wall segment 32B cooperates with the respective camming faces 33A and 33B to define a series of second shoulders 35 facing toward the opposing end 12. Extending radially outwardly from the second cylindrical wall segment 32B in an area circumferentially aligned with each of the camming faces 33A is a rectangular post 36. Each post 36 extends an axial distance greater than the axial distance of the second cylindrical wall segment 32B with the result that a portion of each post 36 extends directly from the portion of the camming faces 33A adjacent the shoulders 35.

The sleeve 20 is co-axial with the axis A when the body 10 is engaged thereto and extends from a receiving end 41 to an opposing end 42. The sleeve 20 has a generally cylindrical exterior surface 43 for about one-half of its length adjacent the receiving end 41 and inwardly facing wall segments 44 lying on a cylinder sized to snugly receive the exterior cylindrical wall portion 24 of the connector 25. Extending from four substantially equally spaced apart areas of alternate inwardly facing wall segments 44 are four fingers 45 extending in cantilever fashion toward the opposing end 42 and tapering inwardly toward the axis A to a free end 46. In view of the cantilever construction of the fingers 45 and the fact that the sleeve 20 is manufactured from a flexible plastic material, the fingers 45 may be resiliently urged outwardly upon insertion of the body member 10 into the sleeve 20 such that their free ends 46 may be moved to a position in alignment with the cylindrical intermediate portion 32B but will spring back to engage the respective aligned second camming faces 33B and the shoulders 35 as shown in FIGS. 1 and 2 following movement of the intermediate portion 32B beyond the free ends 46.

A plurality of eight inwardly facing grooves 47 extend generally parallel to the axis A. The grooves 47 are aligned in pairs such that each pair includes one groove 47A aligned with one edge of a finger 45 and the other groove 47B aligned with the other edge of such finger 45. The sleeve 20 is provided with four generally rectangular openings 48, one aligned with each of the fingers 45. Each rectangular opening 48 extends axially beyond the free end 46 in which each finger 45 is positioned and the openings 48 are circumferentially wider than the fingers 45 such that the fingers 45 will be positioned in the openings 48 when they are urged outwardly. The exterior wall surface 43 for a short distance between the inlet end 41 and the rectangular openings 48 becomes a full cylindrical band 43A and between the rectangular openings 48 and the opposing end 42 becomes a full cylindrical band 43B.

The portion of the sleeve 20 between the full cylindrical band 43B and the opposing end 42 includes a plurality of four recessed wall segments 51 lying on a section of a cylinder, each of which is separated from the adjacent wall segment 51 by a thicker wall segment band 52 extending longitudinally and aligned in the longitudinal direction centrally with the rectangular openings 48. Each longitudinal wall segment band 52 has a slot 53 extending completely therethrough from the opposing end 42 to a position about one-half the distance to the full cylindrical band 43B. The opposing end 42 has a radially inwardly directed flange 54. The sleeve 20 has an interior wall portion 55 in the area between the rectangular openings 48 and the flange 54 which is cylindrical throughout. The diameter of the inner wall portion 55 is substantially the same as that of the predetermined diameter of the lead-in portion 31 so that, upon engagement as shown in FIG. 1, the lead-in portion 31 will snugly engage the interior wall portion 55 of the sleeve 20 thereby providing good side-load support of the engage coupling in that area.

The sleeve 20 is supported on the adapter 30 which functions as a second connector and has a connection end 57 having an axially extending passageway 58 and an outwardly facing threaded portion 59 for engagement with an end of a fluid flow line (not shown). The adapter has an enlarged casing 60 on the opposite side of the threaded portion from the connection end 57 which extends from a radial shoulder 61 adjacent the threaded portion 59 to an inner end 62. The casing 60 has an outwardly facing cylindrical exterior surface 63 which has a size permitting it to be positioned in the sleeve 20 with minimal clearance on the order of 0.002 inch to 0.003 inch relative to the interior wall portion 55. The casing 60 is provided with an annular groove 64 between the shoulder 61 and the cylindrical exterior surface 63. The groove 64 is sized to receive the flange 54 of the sleeve 20 for retention of the adapter 30 in the sleeve 20. The presence of the slots 53 at the opposing end 42 of the sleeve 20 permits that end of the sleeve 20 including the flange 54 to be resiliently urged radially outwardly upon placement of the adapter 30 therein. The slots 53 extend radially completely through each of the thicker wall segment bands including the flange 54. Preferably, the adapter 30 is provided with a conically tapered surface 65 adjacent the radial shoulder which will service as a ramp to force the flange 54 and adjacent portions of the sleeve 20 outwardly as the adapter 30 is positioned in the sleeve 20 by moving from left to right as viewed in FIG. 1 until flange 54 snaps into groove 64. The sleeve 20 is rotatable relative to the adapter 30.

The casing 60 of the adapter 30 is provided with a cylindrical interior surface 65 extending from said inner end 62 to a radially inwardly directed shoulder 67. An inwardly facing annular groove 68 is formed in the casing spaced slightly from the inner end 62. An annular seal 69 is positioned in the groove 68.

Rigidly mounted in the adapter 30 is a tubular valve 70 having threads 71 engaged to inwardly facing threads 74 in a reduced cross-sectional area of the adapter 30. The tubular valve 70 has a cylindrical wall 72 extending from the threads 74 toward receiving end of the sleeve 20. A passageway 73 is defined by the cylindrical wall 72.

The tubular valve 70 terminates in an enlarged head 75 having three outlet/inlet apertures 76 tapered outwardly at equidistant areas around the axis A. The enlarged head 75 has an annular groove 77 in which is positioned an annular seal 78. The head 75 extends to a face having an annular abutment 80 for engagement with a mating valve supported on the first connector 25 as will be hereinafter described. A slotted recess 79 is formed in a central area of the face for receiving a screwdriver for engaging or disengaging the tubular valve 70 from the adapter 30.

Figure 8:
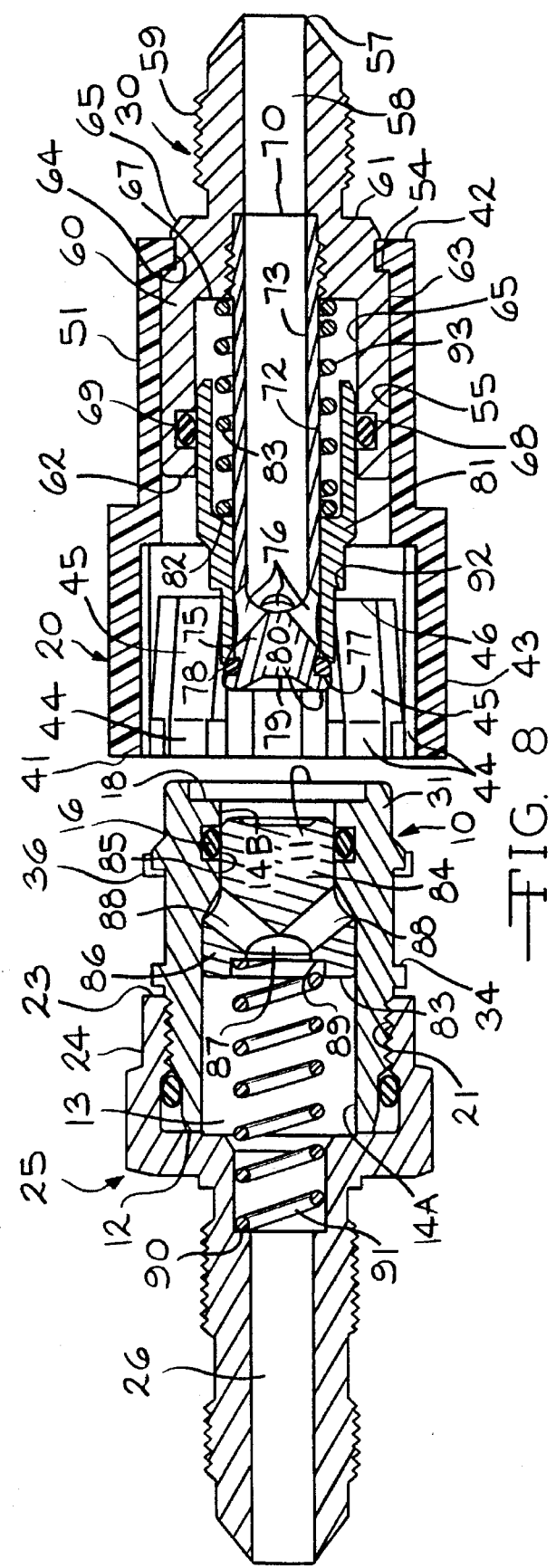
FIG. 8 is a view similar to FIG. 1 with the parts disassembled and the sleeve shown in a different rotational position.
Figure 9:
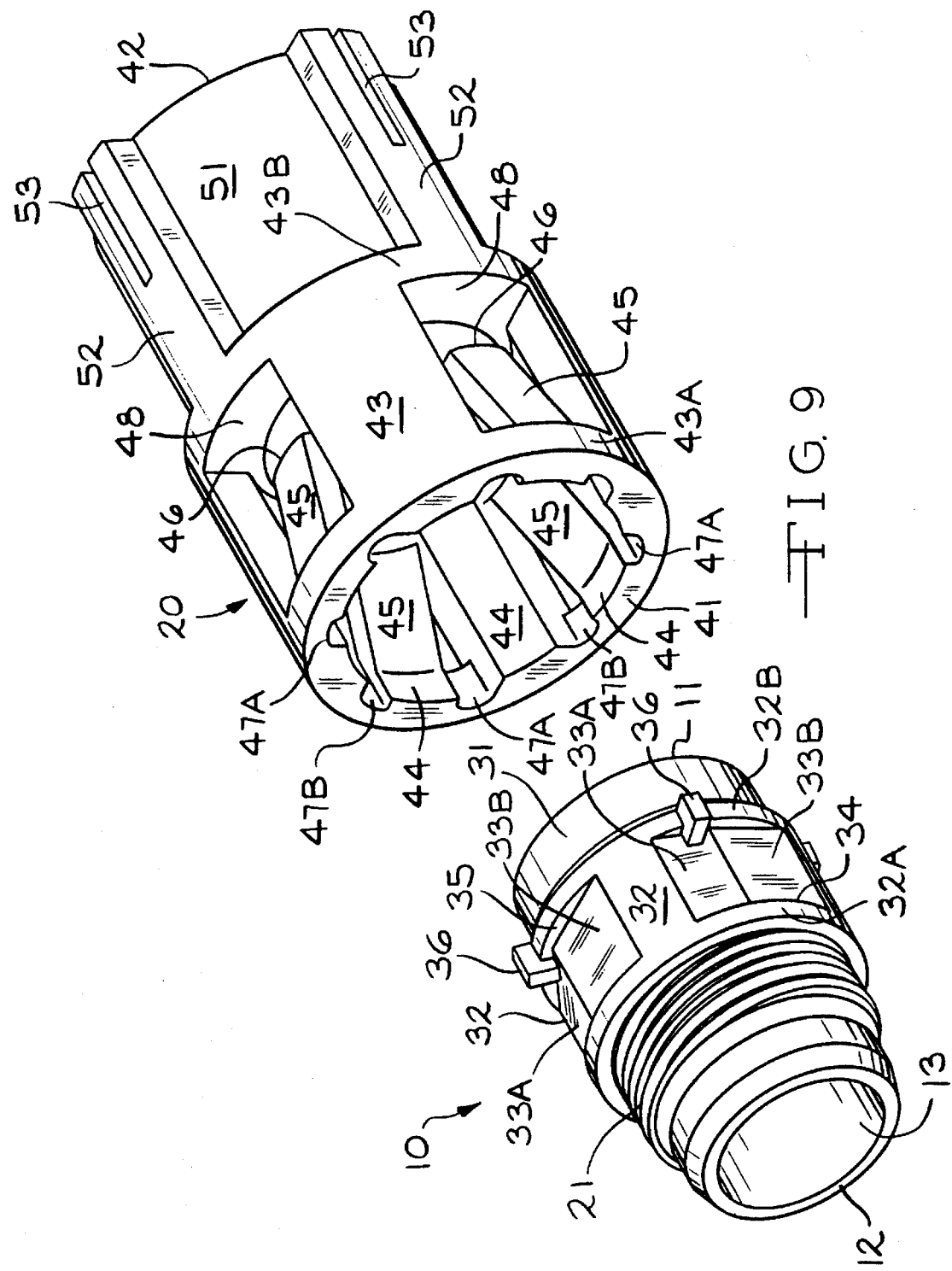
FIG. 9 is an exploded perspective view of the body and sleeve members.

Encircling the cylindrical wall 72 of the tubular valve 70 is a sleeve 81 which is axially moveable thereon from a forward closed position engaged to the annular seal 78 as shown in FIG. 8 to a rearward open position shown in FIG. 1 at which the outlet/inlet apertures 76 are completely open. The sleeve 81 is internally recessed to define a shoulder 82. A compression spring 83 encircles the cylindrical wall 72 and abuts against the shoulder 82 at one end and the shoulder 67 of the adapter 30 of the other end to yieldingly urge the sleeve 81 toward the closed position shown in FIG. 8. The annular seal 69 sealingly engages the exterior surface of the sleeve 81.

Positioned in the body 10 is a second valve 83 which is axially moveable from a closed, sealed position shown in FIG. 8 when the coupling members are disengaged to an open position when the body member 10 and sleeve 20 are engaged as shown in FIG. 1. The second valve 83 has a leading nose portion 84 with a cylindrical exterior surface 85 having a size to sealingly engage the O-ring 16 of the body 10 when the second valve 83 is in the forward position. The diameter of the cylindrical exterior surface 85 is smaller than the diameter of the enlarged cylindrical wall 14A of the body 10. The second valve 83 flares outwardly from the nose portion 84 to an enlarged head 86 which snugly engages the enlarged area 14A of the interior wall and is slidingly moveable therein in an axial direction. The second valve 83 includes a central aperture 87 and a plurality, preferably three, of angled passageways 88 extending from such central aperture 87 through the nose portion 84 and communicating with the reduced diameter exterior surface portion 85 to permit fluid to flow therethrough to the space between the exterior surface 85 and the enlarged interior wall portion 14A when the second valve 83 is in the retracted open position shown in FIG. 1.

Radial annular shoulder 89 encircles the central aperture 87 of the second valve 83. A similarly sized radial shoulder 90 is formed in the passageway 26 of the connector 25. A compression spring 91 is positioned between the annular shoulder 89 of the second valve and the shoulder 90 of the first connector to resiliently bias the second valve 83 forwardly (to the right as viewed in FIGS. 1 and 8) toward the sealed position shown in FIG. 8. As will be apparent to those skilled in the art, axial movement of the two connectors from the disengaged position of FIG. 8 to the engaged position of FIG. 1 will cause the annular abutment 80 of the tubular valve 70 to engage the corresponding annular abutment on the nose portion 84 of the second valve 83. Continued axial movement of such connectors toward one another will cause the tubular valve 70 which is rigidly mounted on the adapter 30 to displace the second valve 83 toward the radial shoulder 90 thereby compressing spring 91 and moving the exterior surface 85 out of sealing engagement with the O-ring 16 to permit fluid to flow through the passageway 26, the central aperture 87, the angled passageways 88 and the space between the exterior surface 85 and the interior wall enlarged portion 14A. Such axial movement will also cause the shoulder 18 of the body 10 to engage the shoulder 92 of the sleeve 81 and urge the sleeve 81 toward the shoulder 67 against the urging of the compression spring 93 to thereby displace the sleeve 81 out of its sealed engagement with the annular seal 78 shown in FIG. 8 to the open position shown in FIG. 1.

Axially displaceable valves utilizing compression springs and annular sleeve are not, in and of themselves new and do not, in and of themselves, form part of the present invention. See, for example, U.S. Pat. Nos. 4,829,117 and 5,139,049, both of which are assigned to the assignee of the present invention.

In moving the opposing connectors from the disengaged position shown in FIG. 8 to the engaged position shown in FIG. 1, the body 10 and first connector 25 should be rotatably aligned in relationship to the sleeve 20 such that the posts 36 engage those grooves 47B which are located at the left edge of each of the fingers 45 in order that the fingers 45 will be aligned with the major recessed camming face 33B. Movement of the body 10 into full engagement with the sleeve 20 will cause the lead-in portion 31 and then the outwardly tapering face and second cylindrical wall segment 32B adjacent thereto to urge the fingers 45 outwardly until each of the free ends 46 is aligned with its respective camming face 33B at which point the free ends 46 of the fingers 45 will resiliently snap inwardly to engage such camming faces 33B and the shoulders 35. The compression springs 83 and 91 act in a direction attempting to push the body member 10 out of the sleeve 20, with such disengagement being prevented by engagement of the free ends 46 of the fingers against the shoulders 35. Thus, the two parts comprising the body 10 and connector 25 on the one side and the sleeve 20 and adapter 30 on the other side may be assembled by a simple axial movement toward one another.

In order to release the body 10 and first connector 25 from the sleeve 20 and adapter 30, it is necessary to rotate the body 10 relative to the sleeve 20. When in the normal joined position, rotation is prevented in the one direction by each of the posts 36 engaging the fingers 45 near their free ends 46 and is prevented in the other direction by means of the wall of the adjacent groove 47. In order to rotate the body and first connector, it is necessary to initially move the body 10 further into the sleeve to a point at which the posts 36 are pushed to a position beyond the free ends 46 of the fingers 45. This is the position shown in FIG. 4. When thus positioned, the sleeve 20 may be rotated in a clockwise direction relative to the body 10 thereby causing the fingers 45 at their free ends 46 to ramp over the respective second camming face 33B onto the first camming face 33A then onto the cylindrical intermediate portions 32 which are misaligned with the shoulders 35 thus permitting the disengagement of the parts.

In addition to the advantage of the design of the present invention which permits engagement by a simple axial movement and disengagement by an axial movement followed by relative rotational movement, the present invention also provides that the coupling, when in the engaged position, has good side load support in two different areas, namely, (1) the engagement between the lead-in portion 31 of the body 10 with the inner wall portion 55 and (2) the engagement of the exterior cylindrical wall portion 24 of connector 25 with the inner wall segments 44 of the receiving end 41 of sleeve 20.

Many modifications will become readily apparent to those skilled in the art. Accordingly, the scope of the present invention should be determined only by the scope of the appended claims.

I claim:

1. A coupling comprising:
   (a) a female member including a one-piece sleeve, said sleeve having an annular end defining an inlet and extending along an axis to an opposing end, a plurality of integral fingers, each extending cantilevered from a fixed end in the vicinity of said annular end in a direction away from said annular end and tapering inwardly toward said axis to a free end, said fingers being resiliently urgeably to move said free ends away from said axis, said free ends being spaced from said axis, a portion of said sleeve positioned axially between said fingers free ends and said opposing end having cylinder defining interior surface portions; and (b) a male member including a body extending along an axis from a first end to an engagement end, said body including an engagement section in the vicinity of said engagement end having a generally cylindrical exterior sized to be receivable in said inlet, said exterior including cylinder defining portions and a plurality of camming faces recessed from said cylinder defining portions and cooperating therewith to form shoulders at said camming faces spaced from and facing away from said engagement end, each camming face being circumferentially separated from adjacent camming faces by said cylinder defining portions, the portion of said cylindrical exterior adjacent said engagement end being sized to be snugly received in said sleeve cylinder defining interior surface portions, said body, upon insertion of said engagement end into said female member inlet engaging and urging said fingers free ends away from said axis and, upon movement of said shoulders axially beyond said fingers free ends permitting said fingers free ends to move inwardly to engage said camming faces and said shoulders to retain said body engaged to said female member.

2. The coupling according to claim 1, wherein said sleeve is capable of rotation relative to said body, said rotation causing said fingers to move circumferentially relative to said camming faces to a position engaged to said cylinder defining portions between adjacent camming faces thereby moving said fingers out of alignment with said shoulders and releasing said body from engagement with said female member.

3. The coupling according to claim 1, wherein said male member includes an outwardly facing cylindrical wall sized to snugly engage said annular end.

4. A coupling comprising:

(a) A female member including a sleeve having an annular end defining an inlet and extending along an axis to an opposing end, a plurality of fingers, each extending cantilevered from a fixed end in the vicinity of said annular end in a direction away form said annular end and tapering inwardly toward said axis to a free end, said fingers being resiliently urgeable to move said free ends away from said axis, said free ends being spaced from said axis; and (b) a male member including a body extending along an axis from a first end to an engagement end, said body including an engagement section in the vicinity of said engagement end having a generally cylindrical exterior sized to be receivable in said inlet, said exterior including cylinder defining portions and a plurality of camming faces recessed from said cylinder defining portions and cooperating therewith to form shoulders at said camming faces spaced from and facing away from said engagement end, each camming face being circumferentially separated from adjacent camming faces by said cylinder defining portions, said body, upon insertion of said engagement end into said female member inlet engaging and urging said fingers free ends away from said axis and, upon movement of said shoulders axially beyond said fingers free ends permitting said fingers free ends to move inwardly to engage said camming faces and said shoulders to retain said body engaged to said female member, said female member sleeve being capable of rotation relative to said body, said rotation causing said fingers to move circumferentially relative to said camming faces to a position engaged to said cylinder defining portions between adjacent camming faces thereby moving said fingers out of alignment with said shoulders and releasing said body from engagement with said female member and said female member sleeve being provided with a plurality of inwardly facing longitudinal grooves extending from said annular end, said grooves being circumferentially spaced around said inlet such that a pair of adjacent grooves are aligned on opposite sides of each of said fingers and said body being provided with a plurality of posts positioned to be received in said grooves upon insertion of said body into said female member, said posts being releaseably engageable with said fingers to prevent, and upon release permit, rotation of said female member sleeve relative to said body.

5. The coupling according to claim 4, wherein rotation of said female member relative to said body in one direction is prevented by engagement of said fingers in said grooves and in the other direction is prevented while said posts are engaged to said fingers.

6. The coupling according to claim 5, wherein said camming faces include a first section and a second section disposed at an obtuse angle to said first section, said posts extending outwardly from said first sections and said fingers contacting said second sections when said body is engaged to said female member, said fingers being moveable from said second sections, across said first sections to a position engaged to said cylinder defining portions upon rotation of said female member relative to said body.

7. The coupling according to claim 4, further including at least one spring yieldingly urging said female member and said body, when engaged, in a direction away from each other and wherein axial movement of said body deeper into said female member releases said posts from said fingers.

8. The coupling according to claim 4, wherein said body has positioned therein an axially displaceable valve yieldingly urgeable from a closed position when said body is disengaged from said female member to an open position when said body is engaged to said female member and wherein said female member is provided with an axially extending valve yieldingly moveable axially from a closed position when said female member is disengaged from said body to an open position when said female member is engaged to said body member.

9. The coupling according to claim 8, further including a first spring yieldingly urging said body valve toward said closed position and a second spring yieldingly urging said female member axial valve toward said closed position, said first and second springs applying compressive forces tending to move engaged body and female members apart, axial movement of said body further into said female member beyond the point at which said finger free ends engage said shoulders releasing said post from said fingers to permit rotation of said female member about said body.

10. A coupling comprising a first connector assembly and a second connector assembly, said first connector assembly including, (a) a connector part engageable with one end of a fluid flow line, said connector part extending along an axis from a first end to a second end and including, (i) an axial passageway extending from said first end to said second end, and (ii) a housing extending from said second end toward said first end, said housing including an annular wall encircling said axis, and (b) a body member having an internal end positioned in said housing, said body member extending in an axial direction outwardly from said housing to an exterior end and having, (i) an inner side defining an axial passageway extending from said internal end to said exterior end; and (ii) an outer side including a portion in the area of said exterior end having, (A) a plurality of segments each lying on a cylinder of predetermined diameter, said segments extending in a longitudinal direction toward said exterior end;

(B) a plurality of camming faces recessed from said segments, each of said camming faces extending circumferentially between adjacent segments and extending longitudinally between a central end and an engagement end;

(C) a shoulder extending outwardly from each of said camming faces to said engagement end; and (D) a lead-in portion adjacent said exterior portion defining a cylinder of predetermined diameter;

said second connector assembly including (c) an adapter engageable with a second end of a fluid flow line; and (d) a one-piece sleeve fastened to said adapter extending along an axis from a receiving end to an adapter end and having an axial passageway, an annular wall at said receiving end defining an opening sized to receive said body member, a plurality of integral fingers, each extending from said annular wall toward said adapter end and tapering inwardly toward said axis to an unsupported free end, each of said fingers being resiliently urgeable away from said axis, a portion of said sleeve between said fingers free ends and said adapter end being sized to snugly receive said body member lead-in portion, movement of said body member exterior end into said sleeve receiving end with said camming faces aligned with said fingers causing said finger free ends to be displaced outwardly and to snap inwardly upon said camming faces becoming aligned therewith to engage said shoulders to thereby retain said body member in said sleeve, release of said body member from said sleeve being effected by rotating said sleeve relative to said body member to move said finger free ends along said camming faces and into engagement with said segments.

11. A coupling comprising a first connector assembly and a second connector assembly, said first connector assembly including, (a) a connector part engageable with one end of a fluid flow line, said connector part extending along an axis from a first end to a second end and including, (i) an axial passageway extending from said first end to said second end, and (ii) a housing extending from said second end toward said first end, said housing including an annular wall encircling said axis, and (b) a body member having an internal end positioned in said housing, said body member extending in an axial direction outwardly from said housing to an exterior end and having, (i) an inner side defining an axial passageway extending from said internal end to said exterior end; and (ii) an outer side including a portion in the area of said exterior end having, (A) a plurality of segments each lying on a cylinder of predetermined diameter said segments extending in a longitudinal direction toward said exterior end;

(B) a plurality of camming faces recessed from said segments, each of said camming faces extending circumferentially between adjacent segments and extending longitudinally between a central end and an engagement end:

(C) shoulder extending outwardly from each of said camming faces to said engagement end;

said second connector assembly including (c) an adapter engageable with a second end of a fluid flow line; and (d) a sleeve fastened to said adapter extending along an axis from a receiving end to an adapter end and having an axial passageway, an annular wall at said receiving end defining an opening sized to receive said body member, a plurality of fingers, each extending from said annular wall toward said adapter end and tapering inwardly toward said axis to an unsupported free end, each of said fingers being resiliently urgeable away from said axis, said sleeve being provided with a plurality of inwardly facing longitudinal grooves extending from said annular wall, said grooves being circumferentially spaced around said annular wall such that a pair of adjacent grooves are aligned on opposite sides of each of said fingers, movement of said body member exterior end into said sleeve receiving end with said camming faces aligned with said fingers causing said finger free ends to be displaced outwardly and to snap inwardly upon said camming faces becoming aligned therewith to engage said shoulders to thereby retain said body member in said sleeve, release of said body member from said sleeve being effected by rotating said sleeve relative to said body member to move said finger free ends along said camming faces and into engagement with said segments, said body member being provided with a plurality of posts positioned to be received in said grooves upon insertion of said body member into said sleeve, said posts being releaseably engageable with said fingers to prevent, and upon release permit, rotation of said sleeve relative to said body member.

12. The coupling according to claim 11, wherein rotation of said sleeve relative to said body member in one direction is prevented by engagement of said fingers in said grooves and in the other direction is prevented while said posts are engaged to said fingers.

13. The coupling according to claim 12, wherein said camming faces include a first section and a second section disposed at an obtuse angle to said first section, said posts extending outwardly from said first sections and said fingers contacting said second sections when said body member is engaged to said sleeve, said fingers being moveable from said second sections, across said first sections to a position engaged to said segments upon relative rotation of said sleeve relative to said body member.

14. The coupling according to claim 11, further including at least one spring yieldingly urging said sleeve and said body member, when engaged, in a direction away from each other and wherein axial movement of said body member deeper into said sleeve releases said posts from said fingers.

15. The coupling according to claim 11, wherein said body member has positioned therein an axially displaceable valve yieldingly urgeable from a closed position when said body member is disengaged from said sleeve to an open position when said body member is engaged to said sleeve and wherein said sleeve is provided with an axially extending valve yieldingly moveable axially from a closed position when said sleeve is disengaged from said body member to an open position when said sleeve is engaged to said body member.

16. The coupling according to claim 15, further including a first spring yieldingly urging said body member valve toward said closed position and a second spring yieldingly urging said sleeve axial valve toward said closed position, said first and second springs applying compressive forces tending to move engaged body member and sleeve apart, axial movement of said body member further into said sleeve beyond the point at which said finger free ends engage said shoulders releasing said post from said fingers to permit rotation of said sleeve about said body member.

17. A coupling comprising a first connector assembly and a second connector assembly, said first connector assembly including, (a) a connector part engageable with one end of a fluid flow line, said connector part extending along an axis from a first end to a second end and including,
    (i) an axial passageway extending from said first end to said second end, and
    (ii) a housing extending from said second end toward said first end, said housing including an annular wall encircling said axis, and (b) a body member having an internal end positioned in said housing, said body member extending in an axial direction outwardly from said housing to an exterior end and including,
    (i) an inner side defining an axial passageway extending from said internal end to said exterior end;
    (ii) an outer side including a portion in the area of said exterior end having;
        (A) a plurality of segments each lying on a cylinder of predetermined diameter, said segments extending in a longitudinal direction toward said exterior end;
        (B) a plurality of camming faces recessed from said predetermined diameter, each of said camming faces extending circumferentially between adjacent segments and extending longitudinally between a central end and an engagement end;
        (C) a shoulder extending outwardly from each of said camming faces at said engagement end;
        (D) at least one of said camming faces having a post extending outwardly therefrom to an outer edge outwardly of said predetermined diameter and extending to an inner end facing away from said exterior end and axially spaced from said shoulder;

said second connector assembly including (c) an adapter engageable with a second end of a fluid flow line;

(d) a sleeve fastened to said adapter extending along an axis from a receiving end to an adapter end and having an axial passageway, an annular wall at said receiving end defining an opening sized to receive said body member, a plurality of fingers, each extending from said annular wall toward said adapter end and tapering inwardly toward said axis to a free end, each of said fingers being resiliently urgeable to move said free ends away from said axis, at least one inwardly facing, longitudinally extending groove at said receiving end, said groove sized to receive said post upon insertion of said body member into said sleeve and circumferentially positioned to align said camming faces with said fingers; movement of said body member exterior end into said sleeve receiving end with said camming faces circumferentially aligned with said fingers causing said finger free ends to be displaced outwardly and to snap inwardly upon said camming faces becoming aligned axially therewith to engage said shoulders to thereby retain said body member in said sleeve, release of said body member from said sleeve being effected by rotating said sleeve relative to said body member to move said finger free ends along said camming faces and into engagement with said segments; and (e) a spring acting in a direction urging said finger ends against said shoulders, rotation of said sleeve relative to said body member (i) in one direction being prevented by engagement of said post and said groove and (ii) in the other direction by engagement of said finger and said post, said rotation in said other direction being permitted upon axial movement of said body deeper into said sleeve against the urging of said spring to a position at which said finger free end is spaced from said shoulder by a distance greater than the distance from said shoulder to said post inner end.

18. The coupling according to claim 17, wherein said body includes a lead-in portion adjacent said exterior end, said lead-in portion having a cylindrical exterior surface with a smaller diameter than said predetermined diameter and wherein said sleeve has a wall portion with a cylindrical interior surface positioned between said free ends and said adapter end and with a diameter such that said body lead-in portion is in snug engagement with said cylindrical interior surface portion when said body is joined to said sleeve.

19. The coupling according to claim 18, wherein said housing has, at said second end, a cylindrical exterior surface sized to snugly engage said sleeve annular wall at said receiving end.

20. The coupling according to claim 17, wherein said camming faces include a first section and a second section disposed at an obtuse angle to said first section, said posts extending outwardly from said first sections and said fingers contacting said second sections when said body is engaged to said sleeve, said fingers being moveable from said second sections, across said first sections to a position engaged to said segments upon relative rotation of said sleeve relative to said body member.

21. The coupling according to claim 17, wherein said body member has positioned therein an axially displaceable valve yieldingly urgeable from a closed position when said body member is disengaged from said sleeve to an open position when said body member is engaged to said sleeve and wherein said sleeve is provided with an axially extending valve yieldingly moveable axially from a closed position when said sleeve is disengaged from said body member to an open position when said sleeve is engaged to said body member.

* * * * *